(12) United States Patent
Cunha et al.

(10) Patent No.: US 7,478,994 B2
(45) Date of Patent: Jan. 20, 2009

(54) AIRFOIL WITH SUPPLEMENTAL COOLING CHANNEL ADJACENT LEADING EDGE

(75) Inventors: Frank J. Cunha, Avon, CT (US); Edward F. Pietraszkiewicz, Southington, CT (US); David M. Kontrovitz, Manchester, CT (US); Jeffrey R. Levine, Wallingford, CT (US); Young Chon, Manchester, CT (US); Dominic Mongillo, West Hartford, CT (US); Bret Teller, Meriden, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/996,539

(22) Filed: Nov. 23, 2004

(65) Prior Publication Data

US 2006/0107668 A1    May 25, 2006

(51) Int. Cl.
*F01D 5/20* (2006.01)

(52) U.S. Cl. ............... 416/97 R; 416/241 R; 415/115; 60/806

(58) Field of Classification Search ............... 416/97 R, 416/241 R; 415/115; 60/806
See application file for complete search history.

(56) References Cited

U.S. PATENT DOCUMENTS

| | | | |
|---|---|---|---|
| 5,356,265 A | 10/1994 | Kercher | |
| 5,498,133 A * | 3/1996 | Lee | 416/97 R |
| 5,720,431 A * | 2/1998 | Sellers et al. | 416/97 R |
| 5,931,638 A * | 8/1999 | Krause et al. | 416/97 R |
| 6,036,441 A | 3/2000 | Manning | |
| 6,168,381 B1 * | 1/2001 | Reddy | 416/97 R |
| 6,183,198 B1 * | 2/2001 | Manning et al. | 416/97 R |
| 6,254,334 B1 * | 7/2001 | LaFleur | 415/115 |
| 6,290,463 B1 * | 9/2001 | Fargher et al. | 416/97 R |
| 6,402,470 B1 | 6/2002 | Kvasnak | |
| 6,514,042 B2 | 2/2003 | Kvasnak | |
| 6,981,846 B2 * | 1/2006 | Liang | 416/97 R |
| 7,014,424 B2 * | 3/2006 | Cunha et al. | 416/97 R |
| 7,131,818 B2 * | 11/2006 | Cunha et al. | 416/97 R |
| 2003/0044277 A1* | 3/2003 | Bourriaud et al. | 416/97 R |
| 2006/0056967 A1* | 3/2006 | Liang | 416/97 R |

OTHER PUBLICATIONS

Australian Search Report, dated Jul. 21, 2006.

* cited by examiner

*Primary Examiner*—William H Rodriguez
(74) *Attorney, Agent, or Firm*—Carlson, Gaskey & Olds

(57) ABSTRACT

An airfoil, and in a disclosed embodiment a rotor blade, has film cooling holes formed at a leading edge. A supplemental film cooling channel is positioned near the leading edge, but spaced toward the trailing edge from the leading edge. The supplemental film cooling channel directs film cooling air onto a suction wall. The supplemental film cooling channel air is generally directed to a location on the suction wall that has raised some challenges in the past. In a disclosed embodiment, the airfoil is provided with a thermal barrier coating, and the supplemental film cooling air protects this thermal barrier coating.

31 Claims, 4 Drawing Sheets

AIRFOIL WITH SUPPLEMENTAL COOLING CHANNEL ADJACENT LEADING EDGE

BACKGROUND OF THE INVENTION

This invention relates to a cooling scheme for use in an airfoil, such as a turbine blade, wherein a leading edge is supplemented by an additional cooling microcircuit at an area of high stress.

Turbine blades are utilized in gas turbine engines. As known, a turbine blade typically includes a platform, with an airfoil shape extending above the platform. The airfoil is curved, extending from a leading edge to a trailing edge, and between a pressure wall and a suction wall.

Cooling circuits are formed within the airfoil body to circulate cooling fluid, which is typically air. A number of cooling channels extend through the cross-section of the airfoil, and from the platform outwardly toward a tip. Air passes through these channels, and cools the airfoil body, which can become quite hot during operation of the gas turbine engine.

One specialized type of cooling channel is a film cooling channel. A film cooling channel has a number of small holes that direct cooling air outwardly onto an outer surface of the airfoil, with this cooling air then being impinged off of the outer surface to cool the outer surface. One such cooling channel having film cooling holes is positioned near the leading edge of the airfoil. A main cooling channel spaced inwardly from the leading edge typically feeds this leading edge film cooling channel. The leading edge film cooling channel is provided with a number of holes that direct cooling air outwardly onto the outer surface of the airfoil, to provide film cooling on this outer surface.

One area of main design concentration in modern airfoils is the use of varying coatings to provide a number of distinct characteristics to the airfoil. One such coating is a thermal barrier coating that may be placed onto the airfoil to provide some resistance to the airfoil becoming heated to extreme temperatures. Experimental tests of airfoils coated with at least one thermal barrier coating have shown that an area spaced toward the suction wall from the impingement holes of the leading edge film cooling channel has had some erosion in the coating. That is, while the film cooling holes do an adequate job of protecting the coating adjacent the leading edge, an area spaced from the leading edge has had some loss of the coating indicating a need for additional cooling.

Recently, the assignee of the present invention has developed cooling circuits that are embedded into the wall of an airfoil, which have been called microcircuits. These microcircuits are disclosed in a co-pending U.S. patent application Ser. No. 10/637,352, entitled "Microcircuit Airfoil Main Body," and which was filed on Aug. 8, 2003. These microcircuits have never been disclosed for use at the above area adjacent the leading edge film cooling channel and spaced toward the suction wall.

SUMMARY OF THE INVENTION

It a disclosed embodiment of this invention, an airfoil has cooling channels, including several "main" channels extending from a base outwardly towards a tip. A first main channel feeds a leading edge film cooling channel that includes a number of film cooling holes directing cooling air onto the outer skin of the airfoil adjacent the leading edge. A supplemental film cooling channel is placed in a location between the first main film cooling channel and the suction wall. In a disclosed embodiment, this supplemental film cooling channel also is fed by the first main channel. Film cooling holes extend from this supplemental film cooling channel to the suction wall, such that cooling air is brought to impinge off of the suction wall. Thus, the area mentioned above at which the coating had some erosion will be provided with additional film cooling, and the coating will be better protected.

In the disclosed embodiment, there is a web between the first main channel, and a next inward main channel. The location of the film cooling holes from the supplemental film cooling channel on the suction wall is generally aligned with this web. As disclosed, if the web were extended to the suction wall, the location of the film cooling hole would be spaced toward the leading edge from a trailing edge side of this extended web. Further, the location of the film cooling holes from the supplemental film cooling channel would be within a web thickness of the extended location of the leading edge side of this web on the suction wall.

In one disclosed embodiment, this supplemental cooling channel may be a microcircuit having a plurality of crossing pedestals, and a very thin width. The microcircuit may be in fact be a plurality of discrete spaced microcircuits spaced along a distance between the base and the tip.

In an alternative embodiment, the channel is a hollow channel, rather than the above-described microcircuit.

These and other features of the present invention can be best understood from the following specification and drawings, the following of which is a brief description.

DETAILED DESCRIPTION OF THE PREFERRED EMBODIMENT

Figure 1:
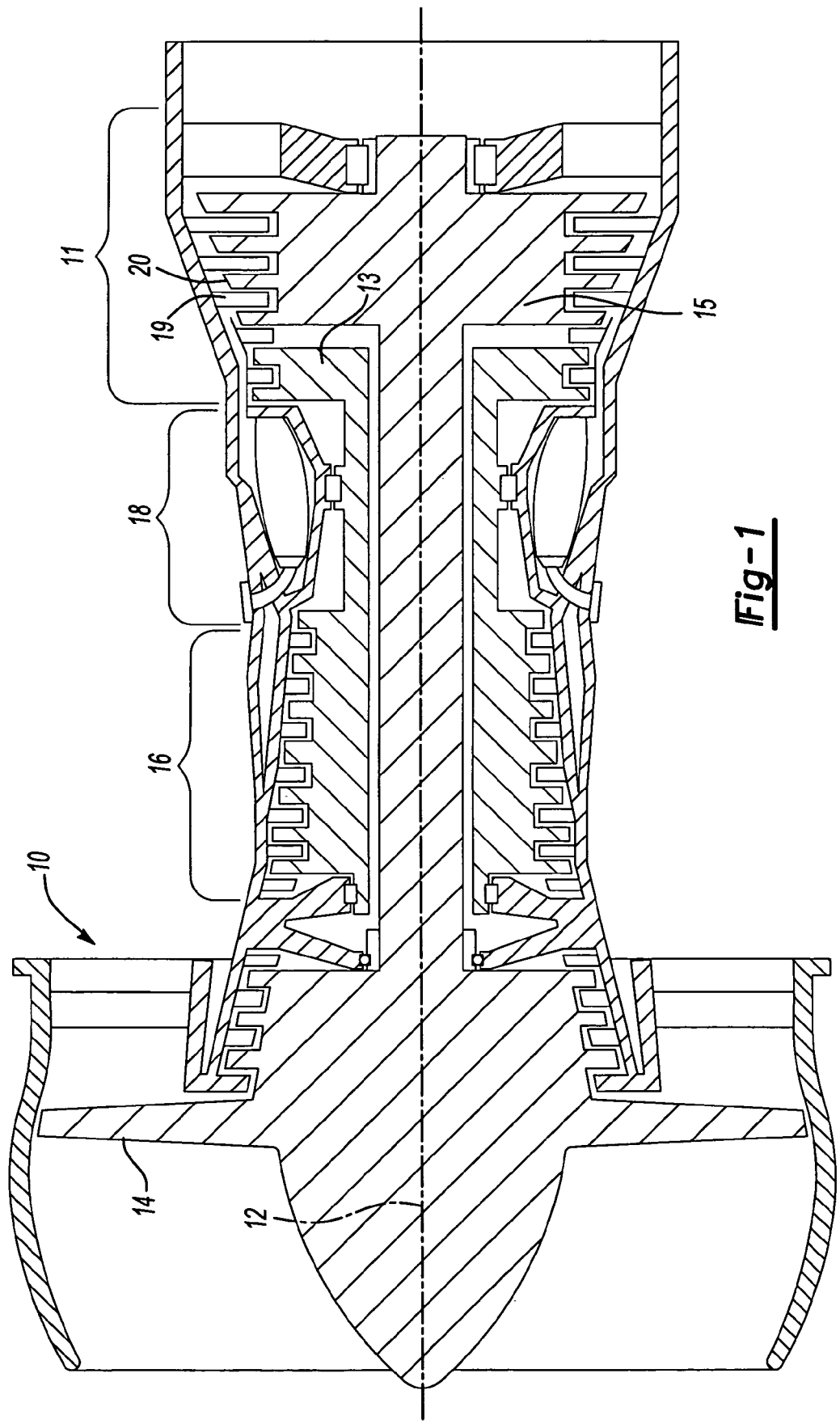
FIG. 1 is a schematic of a gas turbine engine incorporating the present invention.

FIG. 1 shows a gas turbine engine 10, such as a gas turbine used for power generation or propulsion, circumferentially disposed about an engine centerline, or axial centerline axis 12. The engine 10 includes a fan 14, a compressor 16, a combustion section 18 and a turbine 11. As is well known in the art, air compressed in the compressor 16 is mixed with fuel that is burned in the combustion section 18 and expanded in turbine 11. The air compressed in the compressor and the fuel mixture expanded in the turbine 11 can both be referred to as a hot gas stream flow. The turbine 11 includes rotors 13 and 15 that, in response to the expansion, rotate, driving the compressor 16 and fan 14. The turbine 11 comprises alternating rows of rotary blades 20 and static airfoils or vanes 19. FIG. 1 is a somewhat schematic representation, for illustrative purposes only, and is not a limitation on the instant invention that may be employed on gas turbines used for electrical power generation, aircraft, etc.

Figures 2, 3, 4:
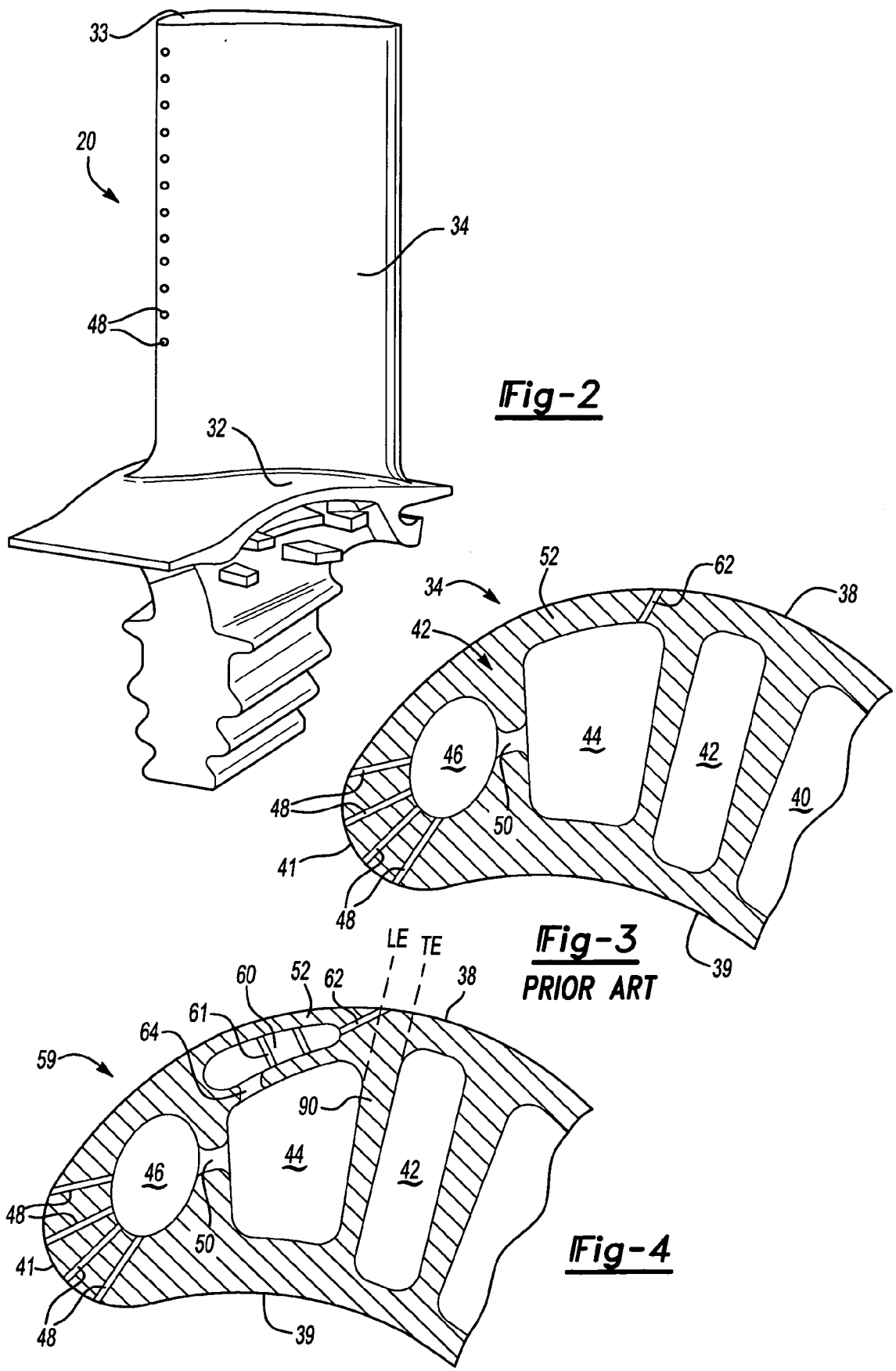
FIG. 2 is a view of a first embodiment invention.
FIG. 3 is a cross-sectional view through a Prior Art turbine blade.
FIG. 4 shows an inventive portion of a first embodiment turbine blade.

A rotary blade 20 is illustrated in FIG. 2 having a platform 32, with an airfoil 34 extending upwardly away the platform 32. While the present invention is being illustrated in a turbine blade, it should be understood that the invention may also have value in static structure such as a vane 19.

Cooling channels are provided through prior art airfoil 34 such as is shown in FIG. 3. Main cooling channel 44 receives airflow from a supply adjacent the platform 32, and directs that airflow outwardly along the length of the airfoil 34. A portion of a serpentine channel is identified by paths 40 and 42 to circulate air in an outward and inward direction as the air flows serially through paths 40 and 42.

As further shown in FIG. 3, a port 50 communicates the main channel 44 to a leading edge film cooling channel 46. A number of film cooling openings 48 extend to the leading edge 41 from the leading edge film cooling channel 46. It should be understood that these ports are spaced from the platform 32 toward the tip 33 of the airfoil 34. That is, and as generally shown in FIG. 2, there are a number of such ports 48 along the length of the airfoil 34.

As mentioned above, when a coating has been provided on this prior art airfoil, there have been problems with erosion of the coating generally beginning in an area shown at 52, and spaced toward the suction wall 38 from the ports 48. It would be desirable to provide additional cooling for the outer surface of the suction wall 38 in this area.

FIG. 4 shows an embodiment 59 having an additional or supplemental film cooling channel 60. As shown, the supplemental film cooling channel 60 is between the first main channel 44 and the suction wall 38. Further, the supplemental film cooling channel 60 is spaced adjacent the suction wall, and toward the trailing edge relative to the leading edge film cooling channel 46.

Film cooling holes 62 extend from the supplemental film cooling channel 60 and exit on the suction wall 38. As with the film cooling holes 48, film cooling holes 62 are spaced along a length of the airfoil such that a complete blanketing of the suction wall 68 by the film cooling air passing from the supplemental film cooling channel 60 is provided on the suction wall 38. Such film cooling air can be described as impingement air in that it will be brought back against the suction wall 38 as the airfoil rotates.

The supplemental film cooling channel 60 is actually preferably a microcircuit cooling circuit. As will be described below, microcircuit cooling circuits are a relatively new innovation, and typically include a plurality of crossing pedestals 61. The supplemental film cooling channel 60 receives air from the main channel 44 from a port 64. Ports 64 and 50 may in fact be a plurality of ports again spaced along the length of the airfoil 34.

The microcircuit structure for the supplemental film cooling channel 60 will be described in more detail below. It should be understood that the width of the microcircuit and dimensions of pedestals 61 are greatly exaggerated in FIG. 4 such that its basic structure can be understood.

Another feature illustrated in FIG. 4 is the location of the film cooling holes 62 along the suction wall 38. As shown, a web 90 separates the first main cooling channel 44 and the next main cooling channel 42. If this web were extended outwardly to the suction wall 38, it would have a trailing edge side TE and a leading edge side LE. In the disclosed embodiment, the film cooling holes 62 are located to be somewhere near this extended location of the web 90. As can be appreciated from FIG. 4, the film cooling holes 62 exit to the suction wall 38 at a location spaced toward the leading edge from the extended trailing edge end TE. Further, the film cooling holes 62 are shown to be within a width of the web 90 from the location of the extended leading edge end LE. In fact, the film cooling 62 are between ends LE and TE.

Some design consideration into the size of the ports 62 should be made, in that the pressures along suction wall 38 will be less than the pressures along the pressure wall 39. Thus, if the holes 62 were of the same size as the holes 48, for example, the holes 62 would see less resistance to airflow, and thus may receive an undesirably large portion of the airflow. However, a worker of ordinary skill in the art would recognize how to properly design and size the relative size of the holes 48 and 62.

Figure 5:
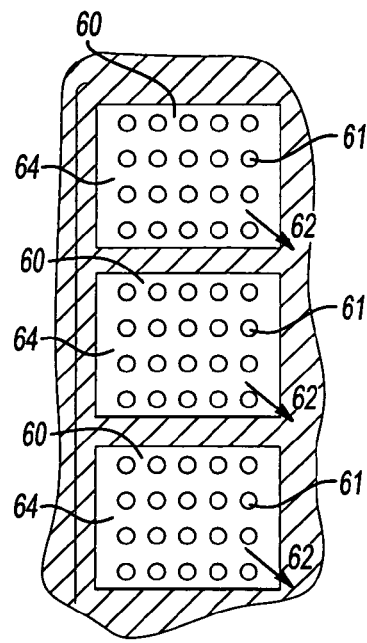
FIG. 5 schematically shows one feature of a FIG. 4 embodiment.

As can be appreciated from FIG. 5, there are a plurality of microcircuits 60 spaced along the length of the airfoil 34. Cooling air is tapped from the main channel 44, through the inlets 64, passes over the pedestal 61, and passes outwardly of the film cooling holes 62.

The detail of the microcircuit can have many distinct shapes, positions, spacings, etc., and varying numbers of entry/exhaust passages per microcircuit, and relative shapes and sizes of the pedestals. Several available options are described below, however, these are merely exemplary. That is, the microcircuits 60 of FIG. 4 can have the configuration of FIG. 6 or 7, or some other configuration. For purposes of this application, the microcircuit is preferably simply a very thin circuit placed at an area where additional cooling is beneficial. The microcircuits that come within the scope of this invention can have varying combinations of pedestal shapes and sizes.

Figure 6:
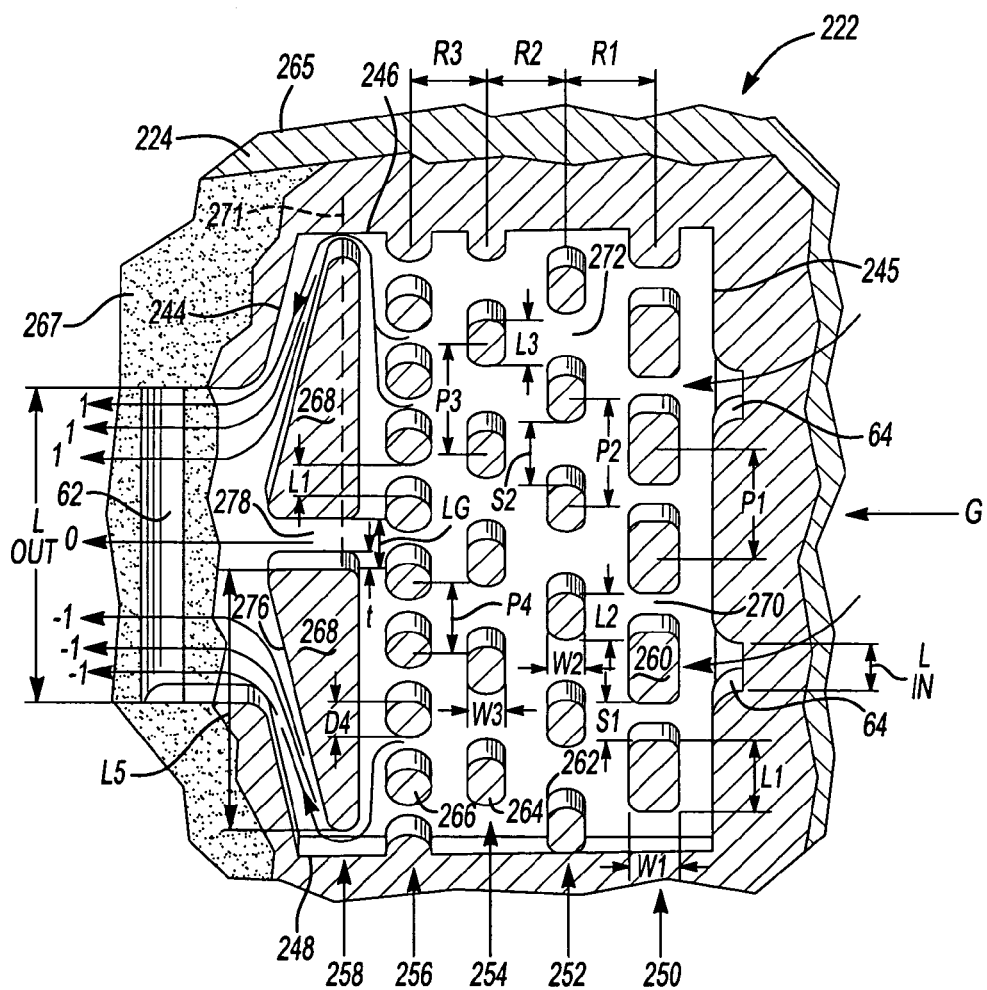
FIG. 6 is an enlarged diagrammatic view of one embodiment of a microcircuit cooling scheme that can be utilized with the present invention.

Referring now to FIG. 6, an exemplary microcircuit 222 will be further detailed. FIG. 6 is an enlarged view of a microcircuit cooling scheme that can be utilized at the FIG. 4 location. Microcircuits offer tailorable, high convective efficiency cooling. Along with high convective efficiency, high film effectiveness is required for an advanced cooling configuration. Microcircuits may be machined or otherwise molded within a part. In a preferred embodiment, the microcircuits are formed of refractory metals forms and encapsulated in the part mold prior to casting. Several refractory metals including molybdenum (MO) and Tungsten (W) have melting points that are in excess of typical casting temperatures of nickel based superalloys. These refractory metals can be produced in wrought thin sheet or forms in sizes necessary to make cooling channels characteristic of those found in turbine and combustor cooling designs. Preferably, parts incorporating this invention are formed in part or in whole of nickel based alloys or cobalt based alloys. Thin refractory metal sheets and foils possess enough ductility to allow bending and forming into complex shapes. The ductility yields a robust design capable of surviving a waxing/shelling cycle. After casting, the refractory metal can be removed, such as through chemical removal, thermal leeching, or oxidation methods, leaving behind a cavity forming the microcircuit 222. It is noted that microcircuits may also be manufactured using investment casting techniques with ceramic cores.

Each "square" of cooling microcircuit 222 embodiments can occupy a wall surface area as great as 0.1 square inches. It is more common, however, for a microcircuit 222 to occupy a wall surface area less than 0.06 square inches, and the wall surface of preferred embodiments typically occupy a wall surface area closer to 0.05 square inches. In the exemplary embodiment, the thickness, t, of the microcircuit 222, as measured into the wall, is preferably of approximately about 0.012 inch to approximately about 0.025 inch, and most preferably about less than 0.017 inch. These dimensions are for a turbine blade having a wall thickness of about 0.045-0.125 inch.

The microcircuit 222 includes a forward end 244, an aft end 245, a first side 246, a second side 248, and a number of rows 250, 252, 254, 256 of posts or pedestals 260, 252, 264, 266, 268, respectively, that extend between an outer wall (246, 265) of the path. The microcircuit 222 extends widthwise between its forward end 244 and aft end 245, and lengthwise, or in the radial direction, between its first side 246 and second side 248. An inlet aperture 64 extends through the first wall portion and is positioned proximate to the aft end 245 of the microcircuit 222 to provide a cooling airflow path from the path 44 of the airfoil 34 into the microcircuit 222. An exit or exhaust aperture 62 extends through the outer wall proximate to the forward end 244 providing a cooling airflow path from the microcircuit 222 into the core gas path, outside the wall. The microcircuit 222 is typically oriented forward to aft along streamlines of the core gas flow, G, although orientation may vary to suit the application at hand. In the exemplary embodiment, there are two race track shaped inlet apertures 64 that extend lengthwise in the radial direction. In the exemplary embodiment, the exit aperture 62 is a slot extending lengthwise in the radial direction. The exemplary length, Lin, of the inlet apertures 64 is about 0.025 inch while the length, Lout, of the exit apertures 62 is about 0.100 inch.

Some example microcircuits will be described to show the versatility of the microcircuit concept. As mentioned, these examples should not be taken as limiting the invention.

The row 250 has pedestals 260 formed substantially as elongated right rectangular cylinders. The pedestals 260 have a length L1 (measured parallel to the row) of about 0.040 inch, a width W 1 (measured perpendicular to the row) of about 0.020 inch, a pitch, P1, of about 0.060 inch and a separation, S1, of about 0.020 inch. The pitch is defined as the on-center radial spacing between the respective pedestals within a row. The spacing is defined as the length of the pitch, P, minus the length of the diameter, D of the pedestal. The ratio of the pedestal dimension along the row, L, to the pitch, P, for the row defines a percentage of area along the particular row that is blocked by the pedestals, or referred to hereinafter as the restriction or blockage factor. For the identified dimensions above, the restriction or blockage factor is 67%.

The next row 264 has pedestals 262 also formed substantially as elongated right rectangular cylinders. The pedestals of this row have length, L2, of about 0.025 inch, a width W2 of about 0.015 inch, a pitch, P2, of about 0.0615 inch and separation, S2, of about 0.0365 inch. In the exemplary embodiment, L2, and W2 are both substantially smaller than L1 and W 1. The pitch P2, however, is substantially the same as P1 and the stagger also completely out of phase so that the pedestals 262 are generally behind associated gap 270. A row pitch, RI, of about 0.0375 inch is between rows 250, 264. For the identified dimensions above, the restriction or blockage factor is 41%.

The next row 254 has pedestals 264 also formed substantially as elongated right rectangular cylinders. The pedestals 264 have length, L3, of about 0.025 inch, a width, W3, of about 0.015 inch, a pitch, P3, of about 0.0615 inch, and a spacing, S3, of about 0.018 inch. In the exemplary embodiment, these are substantially the same as corresponding dimensions of the row 264 thereahead, but completely out of phase so that each pedestal 264 is immediately behind a gap 272. A row pitch, R2, of about 0.033 inch between the row 264 and the row 254 thereahead is like R1. For the identified dimensions above, the restriction or blockage factor is 41%.

The next row 256 has pedestals 266 formed substantially as right circular cylinders of diameter, D4 of about 0.0200 inch, pitch, P4, of about 0.038 inch and a spacing, S4, of about 0.018 inch. In the exemplary embodiment, D4 is smaller than the rectangular pedestal lengths. Additionally, the pitch P4 is smaller than pitches of the other rows and separation S4 is smaller than the separations of the rows other than the row 250. A row pitch, R3, of about 0.014 inch between the row 254 and the row 256 thereahead is, like R1 and R2. For the identified dimensions above, the restriction or blockage factor is 53%.

The next row 258 has two pedestals 268 each having a longitudinal axis 271 through the body of the pedestal such that the axis 271 extends in the radial direction. Thus, the pedestals 268 are elongated in shape in the radial direction and are aligned with the exit apertures 62 as shown in FIG. 6. The pedestals 268 are separated by a gap 278 that is centrally aligned with the exit aperture 64 in the forward end 244 of the microcircuit 222. The length, Lg, of the gap 278 in the radial direction is preferably no greater than about 0.015 inch. The pedestals 268 have generally a protrusion or apex 276 extending outward towards the exit aperture 64 to which it is aligned. In the exemplary embodiment, the length, L5, of the pedestals 268 along the radial direction is about 0.079 inch.

Thus, the rows 250, 252, 254, 256 and 258 have been described above and now the benefits achieved by the microcircuit of FIG. 6 will now be described.

The first row 250 of pedestals 260 are spaced apart from one another in a pattern that controls local velocity and encourages lateral dispersion of cooling air flowing through the microcircuit 222. This dispersion results in the formation of wakes and increased heat pick up within the cooling circuit 222. The pedestals 260 are offset or staggered from the pedestals 262 of row 264. Likewise, the pedestals 264 of row 254 are offset from the pedestals 262 of row 264. The respective offsets are enough such that there is substantially no straightline passage through the microcircuit 222. As the air passes through the pedestals 262 and 264, the wakes are reduced for a more uniform flow distribution. This result is achieved due to the relatively low restriction factor of the rows 264, 254 compared to the rows 250 and 256. Thus, the rows 264, 254 serve to minimize trailing wake turbulence and provide a progressive transition in wakes/turbulence within the cooling circuit 222. As the air passes through the next row 256, the air is metered thus increasing the velocity and, in turn, the heat transfer. It is noted that the row 250 has a greater restriction factor than the rows 264, 254, 256. Thus, air flow into the microcircuit 222 is distributed without excessive pressure drop and in a manner to maximize heat transfer.

The pedestals 268 minimize the wakes created by the turbulence of the air as it passes through the rows 250, 252, 254. Minimization of the wake turbulence avoids hot flow recirculation within the microcircuit 222 and facilitates heat pickup. As the air flow is directed around the pedestals 268, it is uniformly distributed through the exit apertures 64. The use of slots for the exit apertures 64 is now appreciated. As the air exits the slots, a uniform film blanket of the 38 sidewall, is achieved. Thus, the pedestals 268 prevent flow streaking or discrete jets and through the exit aperture 64. Streaking is not advantageous as the corresponding air jets upon exiting through the exit aperture 64 will not provide uniform coverage of the metal resulting in possible hot spots of the wall 38.

Advantageously, the positioning of the pedestals 268, as described above, permits very good metering control of the air as it exits through the exit aperture 64. More specifically, the cooling air flows through the gap 278 and around the pedestals 268 close to the first and second sides 246, 248. Thus, as the flow is metered through row 256, part of the flow will pass through the gap 278 while the remainder of the air will pass around the pedestals 268. Also, in this way and as shown by the streamlines 0, 1, 1', of FIG. 6, the air flow through the exit aperture 64 is uniformly distributed. The center streamline 0 operates so as to not permit the streamlines 1 from crossing over to interfere with the streamlines 1' and visa versa. Thus, the orientation of the pedestals 268 permit flow straightening while ensuring accurate metering control with the result being an improved film cooling and effectiveness.

Figure 7:
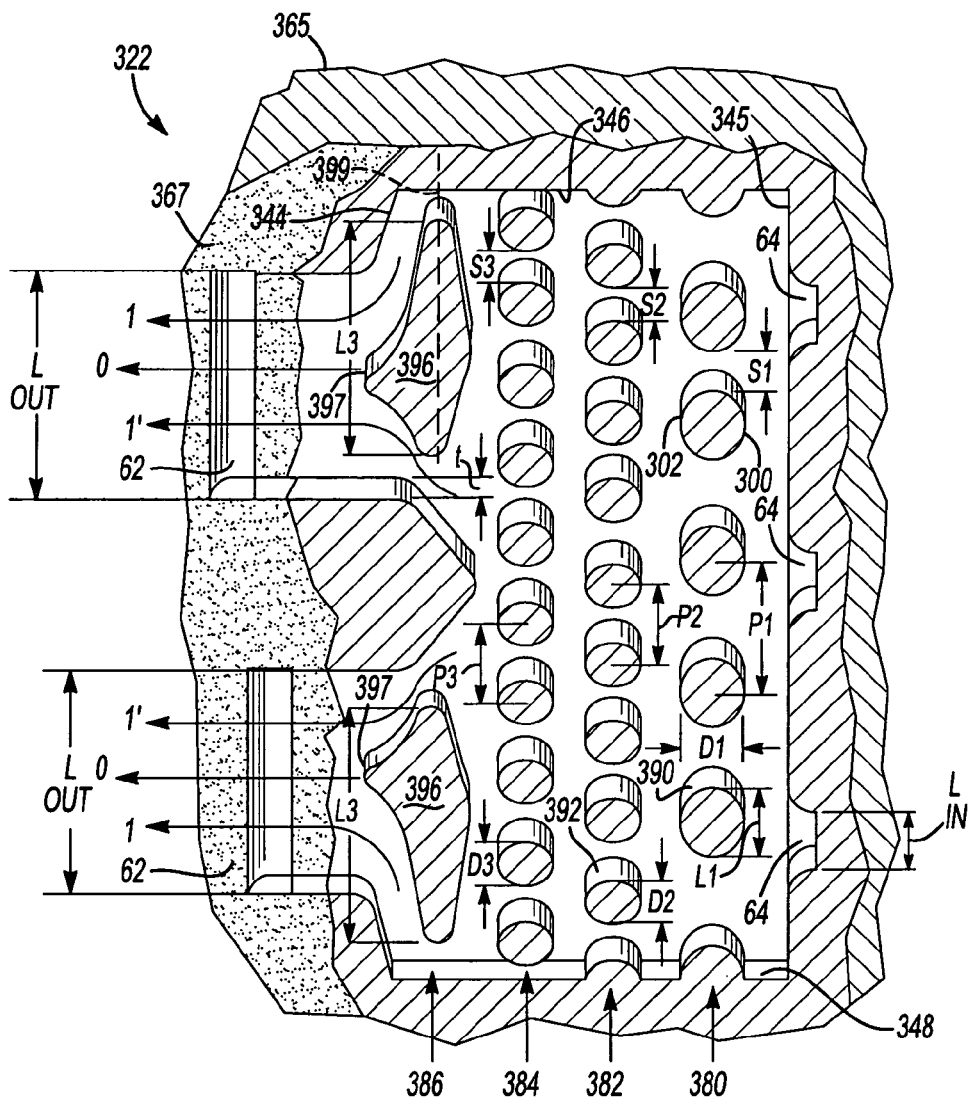
FIG. 7 is an enlarged diagrammatic view of an alternative embodiment microcircuit cooling scheme.

Referring now to FIG. 7, an alternate embodiment of the microcircuit 322 is shown. Like reference numbers and designations in the various drawings indicate like elements. The microcircuit 322 in this alternative embodiment has two exit apertures 62 and three inlet apertures 64. The exemplary embodiment microcircuit 322 will now be further described with respect to the cooling design and the benefits achieved. In the exemplary alternate embodiment, there are three race track shaped inlet apertures 64 that extend lengthwise in the radial direction and two exit apertures 62, preferably slots, also extending lengthwise in the radial direction. The exemplary length, Lin, of the inlet apertures 64 is about 0.025 inch while the length, Lout, of the exit apertures 62 is about 0.100 inch.

The microcircuits 322 has rows 380, 382, 384, 386 of pedestals or posts 390, 392, 394 and 396, respectively. Row 380 has pedestals 390 formed substantially as rounded triangular-like shaped cylinders in that there is a first side 300 that is flattened and generally perpendicular to the flow direction and then a generally rounded coverging side 302. The pedestals 390 have a major axis length, L1, of about 0.033 inch, a pitch, P1, of about 0.051 inch and a spacing, S1, of about 0.018 inch. The row 380 encourages lateral dispersion of the cooling air flowing into the microcircuit 322. For the identified dimensions above, the restriction or blockage factor is 64%.

The next two rows 382 and 384 have pedestals 392, 394, respectively, that are formed substantially as rounded right rectangular cylinders. Pedestals 392 have a diameter, D2, of about 0.020 inch, a spacing, S2, of about 0.0148 inch and a pitch, P2, of about 0.035 inch. For the identified dimensions above, the restriction or blockage factor is 57%. Pedestals 394 have a diameter, D3, of about 0.020 inch, a spacing, S3, of about 0.0148 inch, and a pitch P3, of about 0.035 inch. For the identified dimensions above, the restriction or blockage factor is 57%. Pedestals 392, 394 are generally offset or staggered relative to each other and serve to meter the air flow passing therebetween. The flow is metered by rows 382 and 384 to increase the flow velocity, local Reynolds Number and corresponding internal heat transfer coefficient.

The last row 386 has two pedestals 396 where each pedestal 396 is aligned with one of the two respective exit apertures 62. The pedestals 396 have a longitudinal axis 399 that extends in the radial direction. Thus, the pedestals 396 are elongated in shape in the radial direction. Each pedestals 396 has generally a protrusion or apex 397 extending outward towards the respective exit aperture 62. Each of the pedestals 396 is generally centrally aligned with the respective exit aperture 62. In the exemplary embodiment, the longitudinal length, L3, of the pedestals 394 is about 0.100 inch.

Thus, the rows 380, 382, 384 and 386 have been described above and now the benefits achieved by the microcircuit 322 of FIG. 7 will now be described.

The first row 380 of pedestals 390 are spaced apart from another and have a shape as described hereinabove that controls local velocity and encourages lateral dispersion of cooling air flowing through the microcircuit 322. Also, the pedestals 390 minimize wake turbulence. The cooling air flow impinges onto the side 300 and is forced around the pedestals 390 by the side 302 thereby reducing the wake formed and avoiding hot spots behind the pedestals 390.

The pedestals 392, 394 of the next two rows 382, 384 are staggered with relation to each other and with respect to the pedestals 390 of the first row 380. Thus, there is substantially no straight line passage through the microcircuit 322. As the cooling air passes through their rows, the wakes are reduced for a more uniform flow distribution.

Advantageously, the positioning of the pedestals 396, as described above, permits very good metering control of the cooling air as it exits through the respective exit aperture 62. More specifically, as the cooling air passes through rows 382 and 384, the air impinges onto the pedestals 396 and is directed around the pedestals to exit through the corresponding exit aperture 62. Also, in this way and as shown by the streamlines, 0, 1, 1', the main streamline 0 provides for uniform flow distribution out through the exit aperture 62. That is to say, the streamlines 1 do not cross with the streamlines 1' and visa versa. The main streamline, 0, like that of the first embodiment shown in FIG. 6, is generally aligned with the center of the corresponding exit aperture 62. However, in the alternative embodiment, the pedestals 396 are aligned with the exit aperture 62 such that the majority of the length, L3, of the pedestals 396 are exposed to the exit aperture 62. As such, the streamlines, as they circumvent the pedestals, are free to exit through the exit aperture 62. Thus, the orientation of the pedestals 396 permit flow straightening while ensuring accurate metering control with the result being an improved film cooling and effectiveness.

Thus, the air flow is directed around the pedestals 396, and is uniformly distributed through the exit apertures 62. The use of slots for the exit apertures 62 is now appreciated. As the air exits the slots, a uniform film blanket of the outer, and more specifically the suction sidewall 38, respectively, is achieved. Thus, the pedestals 396 prevent flow streaking or discrete jets and through the exit apertures 62. Streaking is not advantageous as the corresponding air jets upon exiting through the exit aperture 62 will not provide uniform coverage of the metal resulting in possible hot spots of the wall 38. The pedestals 396 also serve to minimize the wakes created by the turbulence of the air as it passes through the rows 380, 382, 384. Minimization of the wakes avoids flow recirculation within the microcircuit 322 and facilitates heat pick-up.

Notably, for enhanced structural integrity of the airfoil, the microcircuits may be disposed within the wall such that the exit apertures, or slots, are not collinear.

In the exemplary embodiment, as shown in FIG. 5, there will be a plurality of microcircuits disposed within the suction sidewall 38, respectively.

Figure 8:
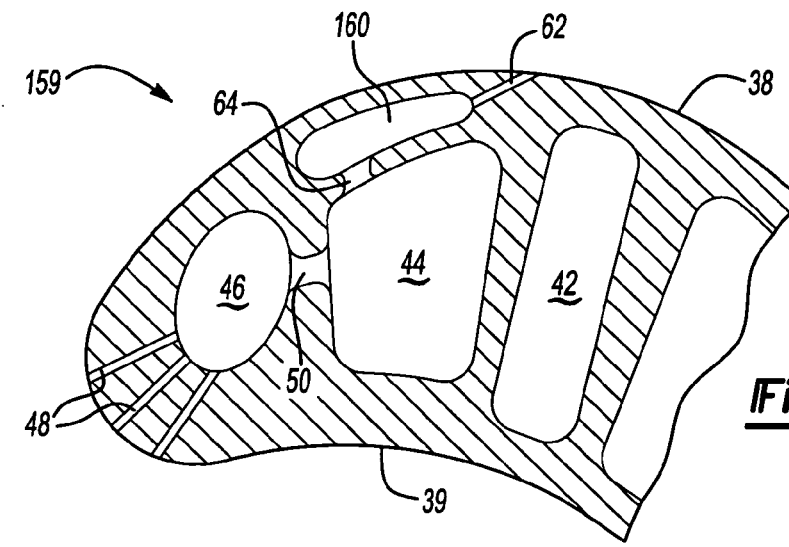
FIG. 8 shows an alternative embodiment cooling channel.

FIG. 8 shows another embodiment 159 wherein the supplemental film cooling channel 160 is hollow, and is more similar to the standard cooling channel such as cooling channels 46 or 44. The supplemental film cooling channel 160 still receives the cooling air from the main channel 44, and directs it outwardly through the opening 64 onto the suction wall 38. Thus, this embodiment provides film cooling air to the suction wall 38 similar to the above embodiment. However, it does not include the microcircuit structure. It is anticipated that a properly designed embodiment for such a supplemental film cooling channel 160 would have a greater width than the microcircuit embodiments described above, and further that the supplemental film cooling channel 160 might be a single channel extending generally through the length of the airfoil 34, rather than a plurality of discrete channels. However, a worker of ordinary skill in the art would recognize the various options available to the final designs.

While the invention is disclosed utilized on a turbine blade having a thermal barrier coating, it should be understood the invention would extend to uncoated turbine blades, and other components of a gas turbine engine.

The present invention thus provides additional cooling at an area that has high thermal and mechanical stress, and have been provided with less cooling capacity than would be desirable.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An airfoil comprising:
an airfoil being curved with a pressure wall and a suction wall spaced from each other, said airfoil extending from a base to a tip, and having a leading edge and a trailing edge connecting said pressure and suction walls;
cooling channels formed between said suction and pressure walls and within said airfoil, said cooling channels including a first main channel extending from said base outwardly and through said airfoil towards a tip, a leading edge channel communicating with said first main channel, said leading edge channel having film cooling ports extending from said leading edge channel and directing cooling air near said leading edge;
a supplemental film cooling channel positioned at an area between said first main channel and said suction wall, said supplemental film cooling channel spaced toward said trailing edge from said leading edge channel, and said supplemental film cooling channel having film cooling ports for directing film cooling air onto said suction wall at a location spaced toward said trailing edge from said film cooling ports of said leading edge channel; and
a web defined between said first main channel and a second main channel spaced toward said trailing edge from said first main channel, said film cooling ports of said supplemental film cooling channel being located on said suction wall to be adjacent an extended location of said web, said extended location of said web being defined by identifying a leading edge side of said web and a trailing side edge of said web, and extending the two edges by lines to the suction wall, and said supplemental film cooling channel extending to said suction wall at a location between said extended edges.

2. The airfoil of claim 1, wherein said supplemental film cooling channel is a microcircuit cooling circuit embedded within said airfoil, said microcircuit cooling circuit receiving cooling fluid to provide additional cooling in said area.

3. The airfoil of claim 2, wherein said microcircuit cooling circuit being smaller in cross-section than said first main channel and said leading edge channel.

4. The airfoil of claim 2, wherein a plurality of pedestals extend across said microcircuit cooling circuit.

5. The airfoil as set forth in claim 4, wherein said pedestals include a plurality of distinct shapes.

6. The airfoil as set forth in claim 2, wherein a thickness of said microcircuit cooling circuit measured in a dimension between said first main channel, and said suction wall is between approximately 0.012 and 0.025 inch.

7. The airfoil as set forth in claim 2, wherein said microcircuit cooling circuit includes a plurality of discrete microcircuits spaced along a direction extending from said base toward said tip.

8. The airfoil as set forth in claim 1, wherein said airfoil is a turbine blade and said base is a platform.

9. The airfoil as set forth in claim 1, wherein said cooling fluid is air.

10. The airfoil as set forth in claim 1, wherein said supplemental film cooling channel is a generally hollow channel.

11. The airfoil as set forth in claim 1, wherein said supplemental film cooling channel receives cooling air from said first main channel.

12. The airfoil as set forth in claim 1, wherein said film cooling ports of said supplemental film cooling channel exit onto said suction wall at a location spaced toward said leading edge from a trailing edge end of said extended location of said web.

13. The airfoil as set forth in claim 1, wherein said web has a width between said first and second main cooling channels, and said film cooling ports of said supplemental film cooling channel exit onto said suction wall at a location within one width of said web from a leading edge end of said extended location of said web.

14. An airfoil comprising:
an airfoil being curved with a pressure wall and a suction wall spaced from each other, said airfoil extending from a base to a tip, and having a leading edge and a trailing edge connecting said pressure and suction walls;
cooling channels formed between said suction and pressure walls and within said airfoil, said cooling channels including a first main channel extending from said base outwardly and through said airfoil towards a tip, a leading edge channel communicating with said first main channel, said leading edge channel having film cooling parts extending from said leading edge channel and directing cooling air near said leading edge;
a supplemental film cooling channel positioned at an area between said first main channel and said suction wall, said supplemental film cooling channel spaced toward said trailing edge from said leading edge channel, and said supplemental film cooling channel having film cooling ports for directing film cooling air onto said suction wall at a location spaced toward said trailing edge from said film cooling ports of said leading edge channel;
a web defined between said first main channel and a second main channel spaced toward said trailing edge from said first main channel, said film cooling ports of said supplemental film cooling channel being located on said suction wall to be adjacent an extended location of said web, said extended location of said web being defined by identifying a leading edge side of said web and a trailing side edge of said web, and extending the two edges by lines to the suction wall, and said supplemental film cooling channel extending to said suction wall at a location between said extended edges; and
a thermal barrier coating being applied to said airfoil.

15. A turbine blade comprising:
an airfoil extending outwardly of a platform, said airfoil being curved with a pressure wall and a suction wall spaced from each other and having a leading edge and a trailing edge connecting said pressure and suction walls;
cooling channels formed between said suction and pressure walls and within said airfoil, said cooling channels including a first main channel extending from said platform and towards a tip of said airfoil, a leading edge channel communicating with said first main channel and directing cooling air onto said leading edge through a plurality of film cooling ports;
a microcircuit cooling circuit positioned between said suction wall and said first main channel, said microcircuit cooling circuit receiving cooling fluid from said first main channel to provide supplemental film cooling onto said suction wall through film cooling ports spaced towards said trailing edge relative to said film cooling ports of said leading edge channel, and said microcircuit cooling circuit having pedestals crossing said microcircuit cooling circuit, said microcircuit cooling circuit being smaller in cross-section than said first main channel; and a web defined between said first main channel and a second main channel spaced toward said trailing edge from said first main channel, said film cooling ports of said supplemental film cooling channel being located on said suction wall to be adjacent an extended location of said web, said extended location of said web being defined by identifying a leading edge side of said web and a trailing side edge of said web, and extending the two edges by lines to the suction wall, and said supplemental film cooling channel extending to said suction wall at a location between said extended edges.

16. The turbine blade as set forth in claim 15, wherein said pedestals include a plurality of distinct shapes.

17. The turbine blade as set forth in claim 15, wherein a thickness of said microcircuit cooling circuit measured in a dimension between said first main channel, and said suction wall is between approximately 0.012 and 0.025 inch.

18. The airfoil as set forth in claim 15, wherein said microcircuit cooling circuit includes a plurality of discrete microcircuits spaced along a direction extending from said platform toward said tip of said airfoil.

19. A gas turbine engine comprising:

a fan;

a compressor;

a combustion section;

a turbine having rotor blades, and vanes, at least one of said rotor blades and said vanes having an airfoil with a base and a tip, and said airfoil extending between a suction wall and a pressure wall and having a leading edge and a trailing edge connecting said pressure and suction walls, cooling channels formed between said suction and pressure walls and within said airfoil, said cooling channels including a first main channel extending from said base outwardly and through said airfoil towards a tip, a leading edge channel communicating with said first main channel, said leading edge channel having film cooling ports extending from said leading edge channel and directing cooling air near said leading edge, a supplemental film cooling channel positioned at an area between said first main channel and said suction wall, said supplemental film cooling channel spaced toward said trailing edge from said leading edge channel, and said supplemental film cooling channel having film cooling ports for directing film cooling air onto said suction wall at a location spaced toward said trailing edge from said film cooling ports of said leading edge channel;

a web defined between said first main channel and a second main channel spaced toward said trailing edge from said first main channel, said film cooling ports of said supplemental film cooling channel being located on said suction wall to be adjacent an extended location of said web, said extended location of said web being defined by identifying a leading edge side of said web and a trailing side edge of said web, and extending the two edges by lines to the suction wall, and said supplemental film cooling channel extending to said suction wall at a location between said extended edges; and said supplemental film cooling channel being a microcircuit cooling circuit embedded within said airfoil, said microcircuit cooling circuit receiving cooling fluid to provide additional cooling in said area.

20. The gas turbine engine of claim 19, wherein said microcircuit cooling circuit being smaller in cross-section than said first main channel and said leading edge channel.

21. The gas turbine engine of claim 19, wherein a plurality of pedestals extend across said microcircuit cooling circuit.

22. The gas turbine engine as set forth in claim 21, wherein said pedestals include a plurality of distinct shapes.

23. The gas turbine engine as set forth in claim 19, wherein a thickness of said microcircuit cooling circuit measured in a dimension between said first main channel, and said suction wall is between approximately 0.012 and 0.025 inch.

24. The gas turbine engine as set forth in claim 19, wherein said microcircuit cooling circuit includes a plurality of discrete microcircuits spaced along a direction extending from said base toward said tip.

25. The gas turbine engine as set forth in claim 19, wherein said airfoil is a turbine blade and said base is a platform.

26. The gas turbine engine as set forth in claim 19, wherein said cooling fluid is air.

27. The gas turbine engine as set forth in claim 19, wherein a thermal barrier coating is applied to said airfoil.

28. The gas turbine engine as set forth in claim 19, wherein said supplemental film cooling channel is a generally hollow channel.

29. The gas turbine engine as set forth in claim 19, wherein said supplemental film cooling channel receives cooling air from said first main channel.

30. The gas turbine engine as set forth in claim 19, wherein said film cooling ports of said supplemental film cooling channel exit onto said suction wall at a location spaced toward said leading edge from a trailing edge end of said extended location of said web.

31. The gas turbine engine as set forth in claim 19, wherein said web has a width between said first and second main cooling channels, and said film cooling ports of said supplemental film cooling channel exit onto said suction wall at a location within one width of said web from a leading edge end of said extended location of said web.

* * * * *

UNITED STATES PATENT AND TRADEMARK OFFICE
CERTIFICATE OF CORRECTION

PATENT NO.       : 7,478,994 B2                                           Page 1 of 1
APPLICATION NO.  : 10/996539
DATED            : January 20, 2009
INVENTOR(S)      : Cunha et al.

It is certified that error appears in the above-identified patent and that said Letters Patent is hereby corrected as shown below:

Claim 9, Column 9, Line 66: "Claim 1" should read as --Claim 2--

Signed and Sealed this

Twenty-first Day of April, 2009

JOHN DOLL
*Acting Director of the United States Patent and Trademark Office*